(12) United States Patent
Bianconi et al.

(10) Patent No.: US 7,587,209 B2
(45) Date of Patent: Sep. 8, 2009

(54) METHOD OF SMS MESSAGE TRANSFER AFTER GPRS ATTACH

(75) Inventors: Richard Bianconi, Rowlett, TX (US); Jay Armstrong, Plano, TX (US); Paul Boudreaux, Garland, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1036 days.

(21) Appl. No.: 10/334,669

(22) Filed: Dec. 30, 2002

(65) Prior Publication Data

US 2004/0127238 A1 Jul. 1, 2004

(51) Int. Cl.
*H04W 4/00* (2006.01)
*H04W 4/14* (2006.01)

(52) U.S. Cl. ...................... 455/466; 370/328

(58) Field of Classification Search .................. 455/466; 370/912, 913
See application file for complete search history.

(56) References Cited

U.S. PATENT DOCUMENTS

| | | | | |
|---|---|---|---|---|
| 5,966,378 A * | 10/1999 | Hamalainen | ................. | 370/348 |
| 6,104,929 A * | 8/2000 | Josse et al. | ................. | 455/445 |
| 6,259,925 B1 * | 7/2001 | Josse | ........................ | 455/466 |
| 6,370,390 B1 * | 4/2002 | Salin et al. | ................. | 455/466 |
| 6,636,491 B1 * | 10/2003 | Kari et al. | ................... | 370/328 |
| 6,741,860 B1 * | 5/2004 | Einola et al. | ................. | 455/450 |
| 6,760,344 B2 * | 7/2004 | Mizell et al. | ................. | 370/475 |
| 2001/0029174 A1 * | 10/2001 | Herajarvi et al. | ............ | 455/406 |
| 2002/0045458 A1 * | 4/2002 | Parantainen et al. | ........ | 455/466 |

OTHER PUBLICATIONS

Wood, Lloyd, "GSM Overview", Jan. 7, 2000, http://www.ee.surrey.ac.uk/Personal/L.Wood/constellations/tables/gsm.html, Entire Document.*

* cited by examiner

*Primary Examiner*—Lester Kincaid
*Assistant Examiner*—Matthew Sams
(74) *Attorney, Agent, or Firm*—Garlick Harrison & Markison; Kevin L. Smith

(57) ABSTRACT

A method in an SGSN of a GPRS/UMTS network for wireless communications including a mobile node, the SGSN, a GGSN, an HLR, an SMS-G and a SMS-SC includes introducing a delay after a mobile node has attached and is connected to allow the delivery of SMS messages before initiating tear down procedures to place the mobile node in a standby mode of operation by tearing down the signaling links between the mobile node and the SGSN. Generally, the inventive process performed by the SGSN includes receiving, from the mobile node, an initial UE (attach request) message to establish a signaling link, authenticating the mobile node to determine whether to allow it to attach to the network, accepting and completing the attach, informing the HLR that the mobile node is attached and delaying the tear down of the signaling links for a period sufficient to enable the SMS-SC to deliver any queued SMS messages.

16 Claims, 5 Drawing Sheets

METHOD OF SMS MESSAGE TRANSFER AFTER GPRS ATTACH

BACKGROUND OF THE INVENTION

1. Technical Field

The present invention relates generally to mobile communication systems and, more particularly, to a method and apparatus in a Universal Mobile Telecommunications System (UMTS) network for delivering short message service (SMS) messages.

2. Description of the Related Art

Wireless packet data networks are being deployed to provide connectionless wireless access to packet data networks. One wireless packet data network that is currently being deployed is General Packet Radio Service (GPRS). GPRS is a non-voice value added service that allows information to be sent and received across a mobile telephone network. It supplements, or rides on top of, today's circuit switched data and short message service networks. The theoretical maximum speed of GPRS includes speeds of up to approximately 171.2 kilobits per second (kbps). This maximum speed is achievable in GPRS systems using all eight timeslots at the same time in a Time Division Multiple Access (TDMA) context.

This speed is about three times as fast as data transmission speeds possible over today's fixed telecommunication networks and ten times as fast as current circuit switched data services on Global System for Mobile Communications (GSM) standard TDMA networks. Thus, GPRS systems are advantageous in that they require less system resources to transmit a fixed amount of data in comparison to using a traditional circuit switched approach. GPRS also facilitates instant connections in which information can be sent or received immediately as the need arises, subject to radio coverage. No dial up modem connection is necessary. GPRS, similar to some broadband connections for personal computers, often is referred to as being "always connected". Thus, another one of the advantages of GPRS is that data may be transmitted immediately, whenever the need arises. In contrast to circuit switched data networks in which a connection must be established to transmit a data packet or data file, GPRS operation is extremely efficient in those situations in which a small amount of data is to be sent. As the emphasis of many designs today are to create wireless computer networks and to connect data devices, including personal computers to wireless transceivers and mobile terminals, such a system that provides instantaneous response is very important for time critical applications and, more generally, for the implementation of wireless computer networks. For example, a remote credit card authorization system implemented in a wireless network can be greatly improved if it is unnecessary for the customer to wait the amount of time that is required to establish a connection. Additionally, GPRS facilitates the use of Internet applications not only from personal computers, but also from appliances and machines. It is anticipated that appliances will be designed to be coupled to the Internet to facilitate control either onsite or remotely. While some people envision connecting these appliances to a network port by physical lines, it would clearly be advantageous to be able to connect such appliances to the Internet through a wireless link. GPRS will facilitate the creation of Internet controlled appliance networks through a wireless medium.

As suggested before, GPRS involves overlaying a packet based air interface on an existing circuit switched wireless network. For example, the circuit switched wireless network may comprise a GSM network. Accordingly, the user is given an option to utilize a packet based data service. In order to overlay a packet based air interface over a circuit switched network, the GPRS standard defines new infrastructure nodes to minimize the impact to existing networks in terms of hardware and software.

Another wireless packet delivery network being deployed, namely, a Universal Mobile Telecommunications System (UMTS) network, also provides connectionless services. A UMTS network includes a core network (CN), a UMTS terrestrial radio access network (UTRAN) and user equipment (UE). The core network provides switching, routing and transit for user traffic. Core network also contains the databases and network management functions. The basic Core Network architecture for UMTS is based on GSM network with GPRS. All equipment has to be modified for UMTS operation and services. The UTRAN provides the air interface access method for User Equipment.

One advantage of GPRS/UMTS is that the packet switching that results from the infrastructure nodes allows the use of radio resources only when users actually are sending or receiving data. Unlike traditional circuit switched voice networks, a connection is not continuously reserved for a user for the intermittent transmission of data. This efficient use of scarce radio resources means that larger number of GPRS users can share the same bandwidth and be served from a single base station or cell. The actual number of users that may use the system at one time, of course, depends on the amount of data being transferred.

The packet domain utilized in GPRS and UMTS systems uses a packet-mode technique to transfer high speed and low speed data and signaling in an efficient manner and generally optimizes network and radio resources. Strict separation between the radio subsystems and network subsystems is maintained, thereby allowing a network subsystem to be reused with other radio technologies. A common packet domain core network is used for both GSM and UMTS. The common core network provides packet switch services and supports differing quality of service levels to allow efficient transfer of non-continuous bit rate traffic (for example, bursty data transfers).

Under existing protocols and designs, a UMTS network establishes a signaling link as a part of establishing a data session. Once a user terminal has "attached" as a part of establishing its presence in the network (and control signaling is complete), the signaling link is torn down. More specifically, an Iu interface established between a radio network controller (RNC) and a serving GPRS support node (SGSN), and a radio resource controller (RRC) interface between the user terminal and the RNC, both for signaling, are released once the user terminal has attached and signaling for the attach procedure is complete. Accordingly, for any subsequent activities, the Iu and RRC interfaces must be re-established. Thus, if an SMS message is being stored in a short message service-service center (SMS-SC), the Iu and RRC interfaces must be re-established to deliver the stored SMS messages. Thus, if an SMS message is in queue and is to be delivered as soon as a user terminal is present, then the Iu and RRC interfaces are torn down and immediately re-established under present designs. Thus, present designs require additional signaling and interface setup and are not efficient when an activity is to take place immediately after a user terminal has attached.

There is a need, therefore, for a system and method that supports and provides more efficient processes relating to tear down of signaling links right after a mobile terminal has attached.

SUMMARY OF THE INVENTION

A method in an SGSN of a GPRS/UMTS network for wireless communications including a mobile node, the SGSN, a gateway GPRS support node (GGSN), a home location register (HLR), a short message service gateway (SMS-G) and a short message service—service center (SMS-SC) includes introducing a delay after a mobile node has attached and is connected before initiating tear down procedures to place the mobile node in a standby mode of operation by tearing down the signaling links between the mobile node and the SGSN. Accordingly, if an SMS message is in queue at the SMS-SC for the mobile node, the overhead associated with both paging the mobile node and re-establishing the signaling links to place the mobile node back into a connected mode of operation to deliver the queued message is avoided. Generally, the inventive process performed by the SGSN includes receiving, from the mobile node, an initial user equipment (UE) (attach request) message to establish a signaling link, authenticating the mobile node to determine whether to allow it to attach to the network, accepting and completing the attach, informing the HLR that the mobile node is attached, and delaying the tear down of the signaling links for a period sufficient to enable the SMS-SC to deliver any queued SMS messages.

In one embodiment of the invention, the SGSN further determines whether to delay tearing down the attached signaling link. In one embodiment, the SGSN determines whether the mobile node is capable of receiving SMS messages by examining the mobile station's capabilities and whether it has SMS message capabilities. In another embodiment, the SGSN merely analyzes the mobile station ID or assigned phone number to determine whether the mobile station is a subscriber to short message services. Thus, while the SGSN is within the delay period, the invention includes, if there is a queued SMS message, receiving the SMS message from the SMS-G (interworking function) and delivering the SMS message to the mobile node. Thereafter, the invention includes tearing down the attached signaling link to place the mobile node in a standby mode of operation.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
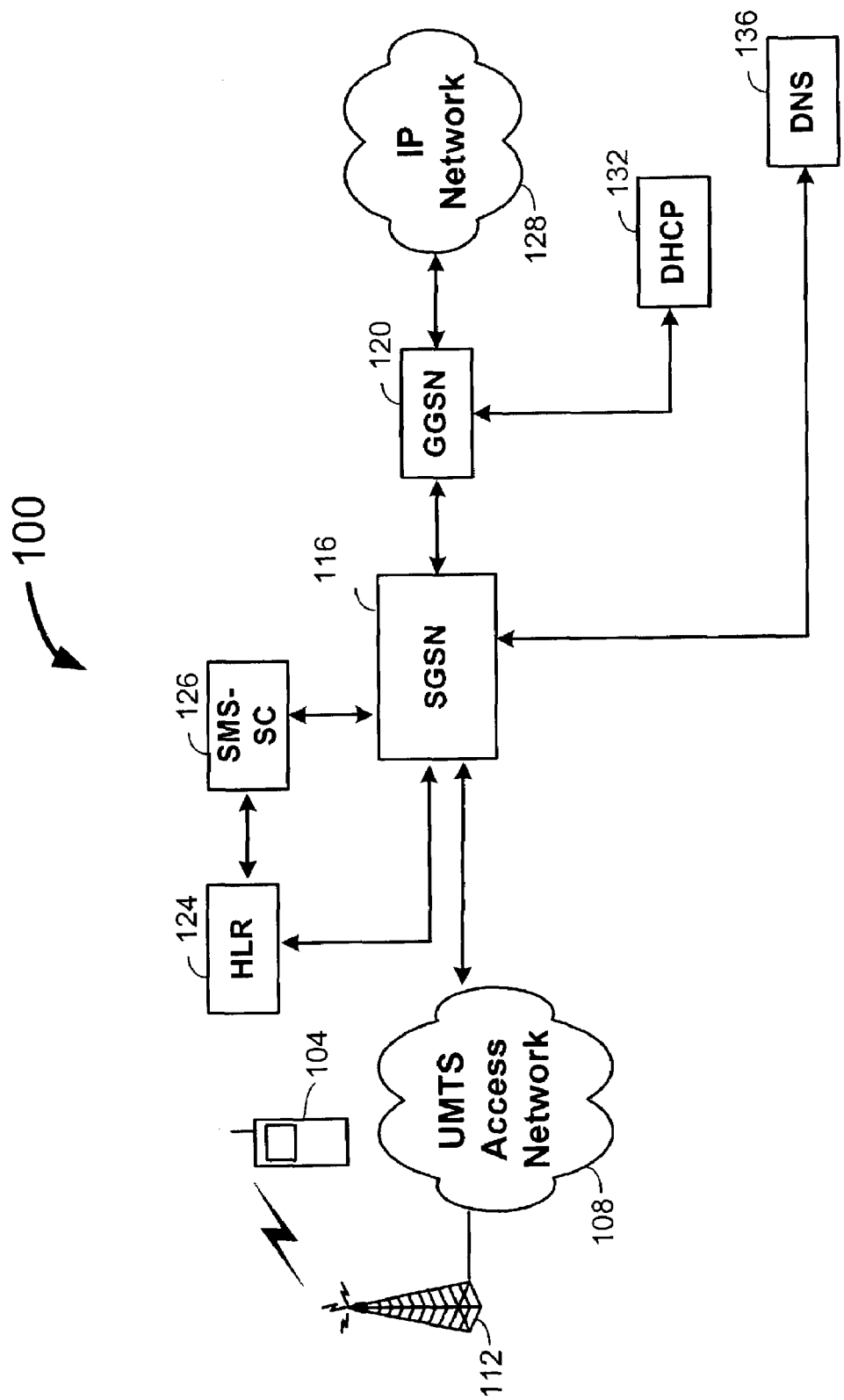
FIG. 1 is a functional block diagram of a communication network formed according to one embodiment of the present invention.

FIG. 1 is a functional block diagram of a communication network formed according to one embodiment of the present invention. For the present embodiment, the network is a UMTS wireless data packet communication network that includes GPRS network elements as well as an IP network (wireline data packet network). The communication network shown generally at 100 includes a mobile node 104 that communicates with radio equipment formed within UMTS access network 108 by way of a tower 112. Mobile node 104 is a UMTS-capable and voice-capable mobile terminal. The UMTS Core network includes an SGSN 116 that is operatively coupled to a GGSN 120. Additionally, an HLR 124 is coupled to provide subscriber information, and other types of information as necessary, to SGSN 116. HLR 124 contains subscriber information for both GSM and UMTS networks, including an indication of pending SMS messages in an SMS service center such as SMS-SC 126. An SGSN, such as SGSN 116, is for communicating with a mobile node 104 to initiate a data session or connection through a wireless data packet network. By analogy, the functionality of an SGSN may be compared to that of a mobile switching center (MSC) in a voice network. A GGSN, such as GGSN 120, provides a gateway, as its name suggests, from the wireless data packet network to a traditional data packet network such as an IP network. Thus, as may be seen, GGSN 120 is operatively coupled to IP network 128.

Generally, the SGSN monitors an individual node location and performs related functions such as access control. The gateway GPRS support node (GGSN) provides interworking with external packet switch networks that is connected to SGSNs via an IP-based packet domain backbone network. Generally, the GGSN provides an interface between the UMTS (and also the GPRS) network and an external packet network.

User data is transferred transparently between the mobile node and external data networks by using encapsulation and tunneling techniques. The data packets are equipped with specific protocol information and are transferred between the mobile node and the GGSN. This transparent transfer method lessens the requirement to interpret external data protocols and facilitates introduction of additional interworking protocols.

GGSN 120 further is coupled to a Dynamic Host Configuration Protocol (DHCP) server 132 while SGSN 116 is operatively coupled to a Domain Naming Server (DNS) 136. The DHCP server 132 is a TCP/IP protocol that enables personal computers and workstations to obtain temporary or permanent IP addresses to use for routing communication signals. Typically a DHCP server communicates with the DHCP clients to dynamically assign IP addresses to nodes whenever needed. DHCP supports manual, automatic and dynamic address assignment and provides the client sub-net mask gateway addresses and domain name server addresses. A DHCP server typically verifies a device identity and "leases" it an IP address on a dynamic basis for use for a specified amount of time. Thereafter, the leased address is reclaimed for reassignment. A DNS includes a plurality of distributed databases that translate computer names to specific IP addresses. A typical DNS server facilitates use of the Internet without requiring one to remember or memorize a long list of numbers. Thus, domain naming servers and the DNS system make it easy to remember an address of a particular destination.

Continuing to examine FIG. 1, SGSN 116 also is coupled to HLR 124. HLR 124, in turn, is coupled to SMS-SC 126. Whenever mobile node 104 attaches to the SGSN 116 as a part of establishing a data session, the SGSN 116 will tear down the signaling links to mobile node 104 to release the resources for other mobile nodes. At the same time, the SGSN 116 communicates with HLR 124 to advise it that mobile node 104 has attached. In current systems, SGSN 116 tears down the signaling link immediately after the mobile node 104 has attached to place the mobile node in a standby mode of operation. As will be described in greater detail below, however, the present invention includes delaying the tear down of the signaling links sufficiently long to allow any pending SMS messages to be delivered to the mobile node 104 prior to tear down of the signaling links.

Figure 2:
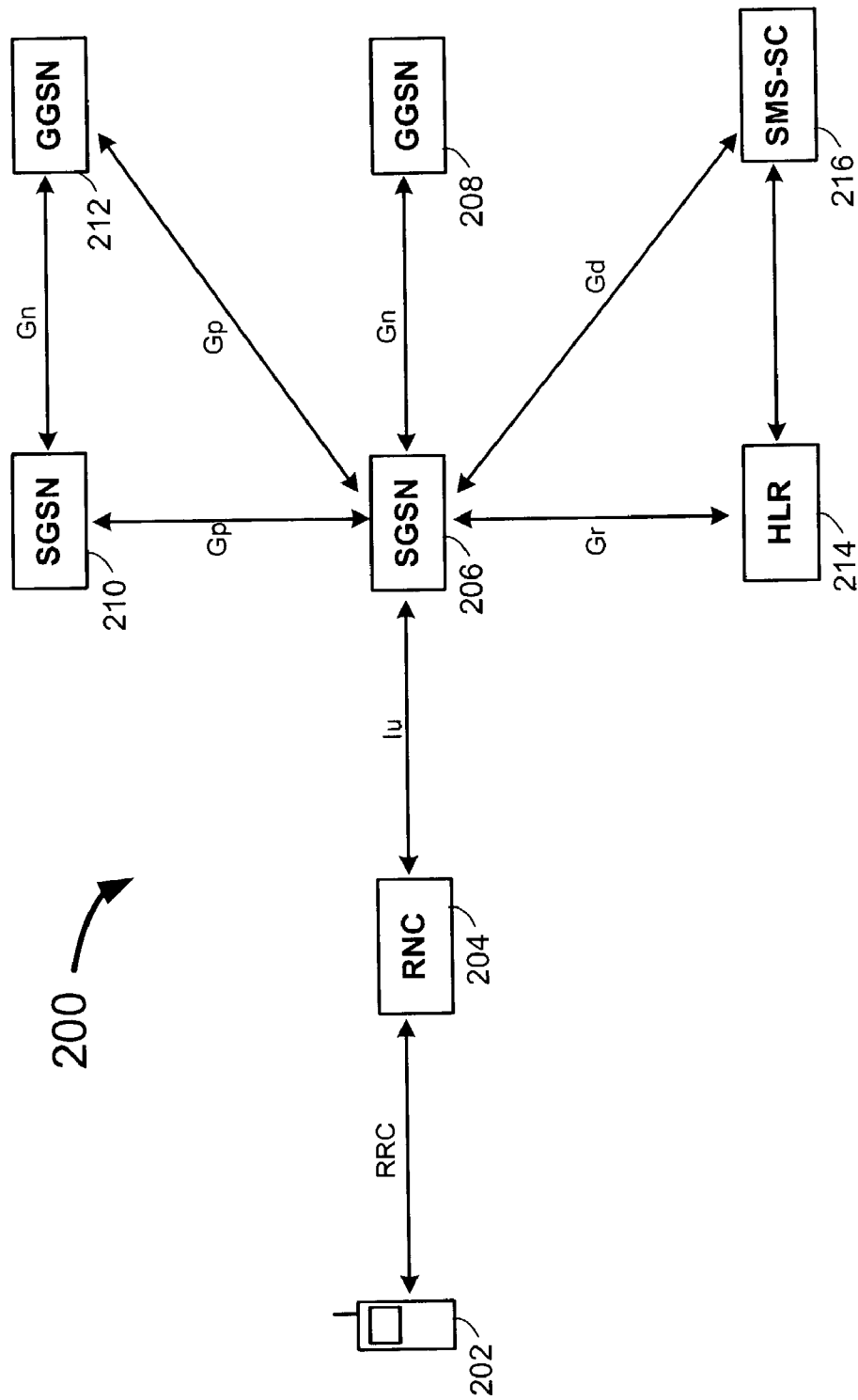
FIG. 2 is a functional block diagram of a UMTS network formed according to one embodiment of the present invention.

FIG. 2 is a functional block diagram of a UMTS network formed according to one embodiment of the present invention. As may be seen, a network 200 comprises a mobile node 202 that is coupled to an RNC 204 which, in turn, is coupled to an SGSN 206. SGSN 206 is coupled to a GGSN 208. While not specifically shown in FIG. 2, it is understood that GGSN 208 provides a gateway function to an external data packet network. As may also be seen, the network of FIG. 2 includes an additional SGSN 210 and a GGSN 212. SGSN 210 and GGSN 212 (for a different public land mobile network (PLMN)).

Mobile node 202 attaches to SGSN 206 by way of RNC 204. The signaling interface between mobile node 202 and RNC 204 is an RRC interface, while the signaling interface between RNC 204 and SGSN 206 is an Iu interface. The interface between SGSN 206 and an HLR 214 is a Gr interface, while the interface between SGSNs 206 and 210 is a Gp interface.

The interface between SGSN 206 and GGSNs 208 and 212 is a Gn and a Gp interface, respectively. As may also be seen, SGSN 206 communicates with an SMS-SC 216 over a Gd interface. Finally, the link between SGSN 210 and GGSN 212 is a Gn interface. The communications that occur over these interfaces are known by those of average skill in the art and are mentioned here for clarity.

Figure 3:
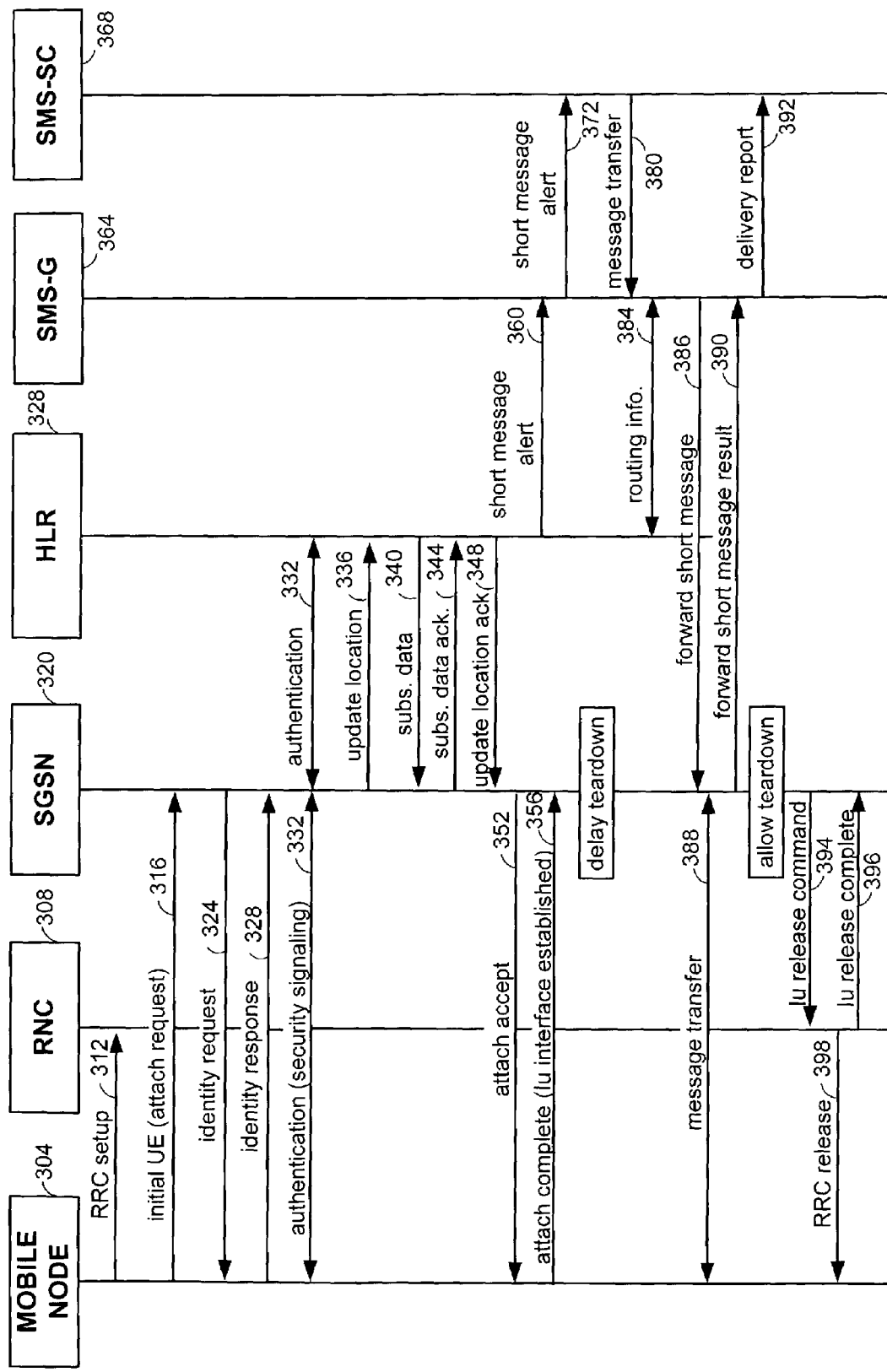
FIG. 3 is a signal sequence diagram that illustrates a method of operation according to one embodiment of the present invention.

FIG. 3 is a signal sequence diagram that illustrates a method of operation according to one embodiment of the present invention. Initially, a mobile node 304 sets up an RRC signaling link with an RNC 308 (flow 312). Thereafter, mobile node 304 generates an initial user equipment attach request (flow 316) to SGSN 320. While not shown explicitly herein, if the proximate SGSN is new (meaning that it had not been recently serving mobile node 304), the new SGSN generates an identification request to the previous SGSN and receives an identification response from it. These steps between the SGSN are not shown herein for simplicity but should be understood to be a part of the present process whenever necessary.

After receiving the attach request in flow 316, the SGSN 320 generates an identity request (flow 324) to mobile node 304. Responsive thereto, mobile node 304 generates an identity response (flow 328) to SGSN 320. Once the identity of mobile node 304 is known, SGSN 320 and an HLR 328 perform known authentication (security signaling in flow 332) to establish that mobile node 304 is permitted to access the network. Once the mobile node 304 is authenticated, SGSN 320 sends an update location message (flow 336) to HLR 328 so that it may update its records with the latest location information for mobile node 304. HLR 328 responds with subscriber data information (flow 340) and SGSN 320 responds with a subscriber data acknowledge signal (flow 344). Thereafter, HLR 328 responds with an update location acknowledge signal (flow 348).

After receiving the update location acknowledge signal from HLR 328, SGSN 320 generates an attach accept signal (flow 352) mobile node 304. Responsive thereto, mobile node 304 generates an attach complete signal (flow 356) to establish that the Iu interface has been successfully set up.

The location update signaling (flow 336) alerts the HLR to the mobile nodes presence in the UMTS network. This prompts HLR 328 to send a corresponding message to SMS-SC 372 if there are any pending SMS messages for mobile node 304 (flow 360). Thus, if there is a pending message, HLR 328 transmits a corresponding message indicating mobile node 304 is attached or connected to an SMS Gateway (SMS-G) 364 (also known as SMS interworking function depending on message flow direction) to prompt SMS-G 364 to inform SMS-SC 368 to deliver any queued SMS messages (flow 372).

Upon completion of the Attach procedure (flow 356), SGSN 320 initiates a delay mechanism prior to initiating a tear down of the signaling links to mobile node 304 to place it in a standby mode. In one embodiment of the invention, the delay mechanism is a ten second count down timer.

SMS-G 364, responsive to flow 372, generates a signal to SMS-SC 368 to inform it that mobile node 304 is connected and to prompt it to deliver queued SMS messages. SMS-SC 368 then initiates a message transfer (flow 380) to deliver the message to SMS-G 364. SMS-G 364 then communicates with HLR 328 to obtain routing information (flow 384). In this case, HLR 328 sends routing information to SMS-G 364 to prompt it to forward the short message to SGSN 320. Thus, SMS-G 364 responds by forwarding the short message to SGSN 320 (flow 386). SGSN 320 then transfers the message to mobile node 304 by way of RNC 308 (flow 388). Thereafter, SGSN 320 forwards the short message result to SMS-G 364 (flow 390). SMS-G 364 then sends a delivery report to SMS-SC 372 (flow 392). At this point, or upon expiration of a countdown timer according to the implemented embodiment of the invention, SGSN 320 allows tear down of the signaling link. Thus, it generates an Iu release command to RNC 308 (flow 394). RNC 308 generates an Iu release complete (flow 396) and RNC 308 and mobile node 304 releases the RRC signaling link (flow 398).

Figure 4:
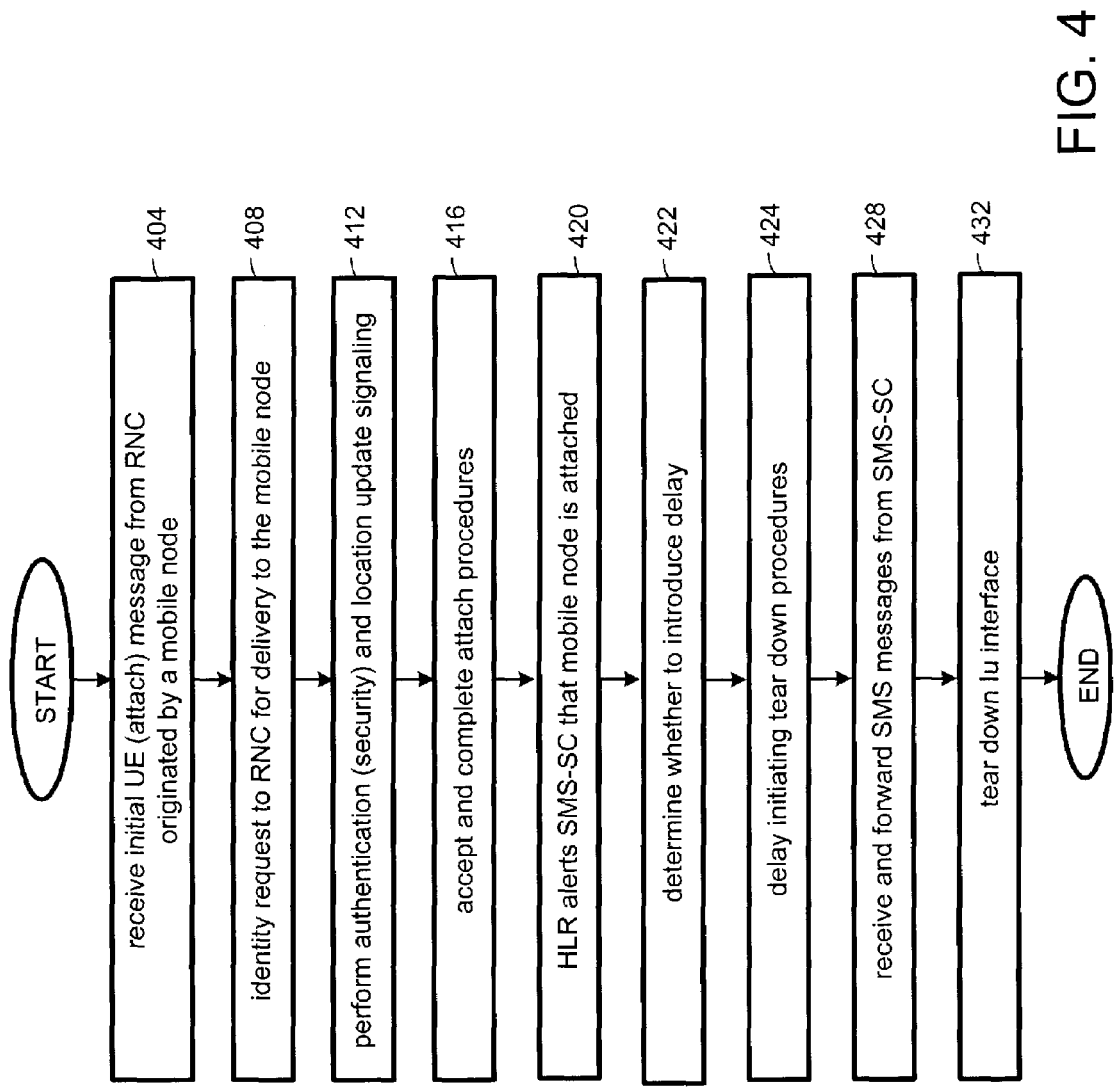
FIG. 4 is a flowchart that illustrates one method for attaching a mobile node to a UMTS network and for delivering SMS messages according to one embodiment of the present invention.

FIG. 4 is a flowchart that illustrates one method for attaching a mobile node to a UMTS network and for delivering an SMS message according to one embodiment of the present invention. An SGSN initially receives a user equipment (UE) attach request message from an RNC originated by the mobile node or user equipment communicating by way of the RNC (step 404). Thereafter, the SGSN generates an identity request to the RNC for delivery to the mobile node (step 408). As a part of allowing the mobile node to attach, the SGSN performs authentication (security) and location update signaling (step 412) and, thereafter, accepts and completes the attach procedures (step 416). Once the mobile node is attached, the HLR informs the SMS-SC that the mobile node is attached (step 420). Optionally, the SGSN determines whether a delay should be introduced prior to initiating tear down procedures (step 422). For this embodiment, the SGSN determines whether the mobile node is an SMS subscriber by examining one of a user profile or the mobile station ID for the mobile node. Alternatively, the SGSN merely examines the mobile station's capabilities to determine whether the mobile node is SMS message capable. In this alternate embodiment, the delay is introduced if the mobile terminal is SMS message capable without actually verifying that the mobile node is a subscriber to short message services.

When the mobile node has successfully attached, the SGSN initiates a countdown timer to introduce a delay prior to initiating tear down procedures for the attached signaling link (step 424). The delay is selected to be sufficiently long to allow a desired task to be completed. In one embodiment of the present invention, the desired task is to allow an SMS-SC to deliver any queued messages. Thus, for that purpose, a delay period in the range of ten to fifteen seconds is selected. It is understood, of course, that the amount of delay is modifiable without departing from the scope of the present invention.

If the SMS-SC has at least one queued message for the mobile node, the SGSN receives and forwards the at least one queued message to mobile node by way of the RNC (step 428). Finally, at the expiration of the select delay period and at the completion of any message or communications with the mobile node (e.g., delivery of SMS messages), the Iu interface between the RNC and the SGSN, and the RRC interface between the RNC and mobile node, are torn down. More simply, any connections are torn down and released for other users (step 432).

Figure 5:
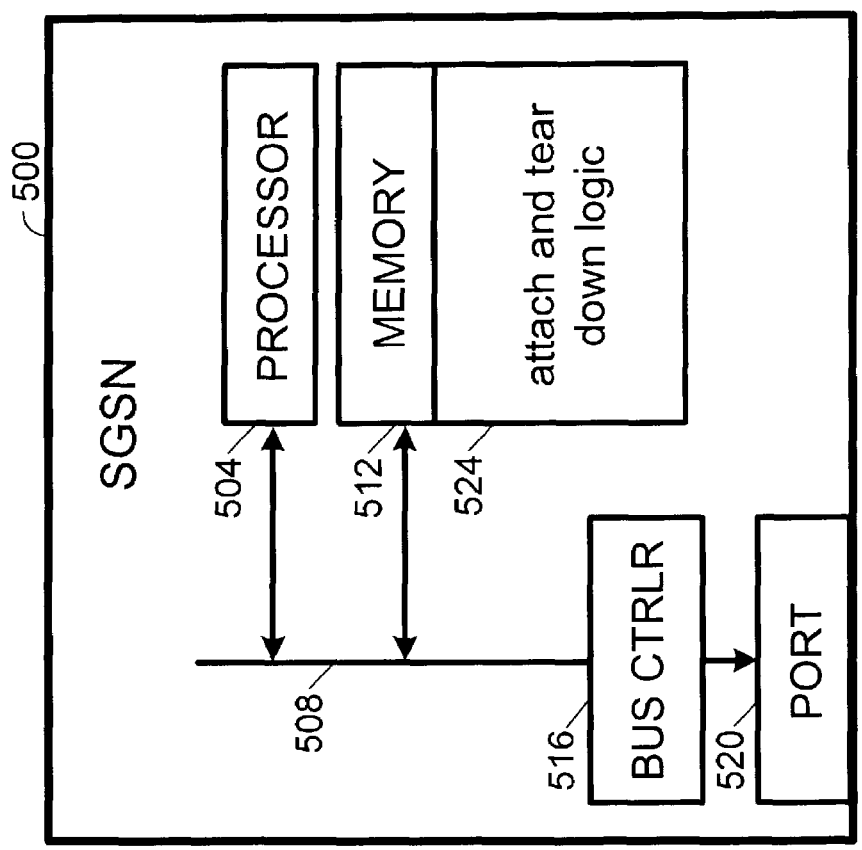
FIG. 5 is a functional block diagram of an SGSN according to one embodiment of the present invention.

FIG. 5 is a functional block diagram of an SGSN formed according to one embodiment of the present invention. A SGSN 500 includes a processor 504 that is coupled to communicate over a bus 508 with a memory 512 and with a bus controller 516. Bus controller 516 is further coupled to communicate with external devices and networks by way of a port 520. Memory 512 includes computer instructions that define the operational logic of SGSN 500. More particularly, however, memory 512 includes a memory portion 524 that includes computer instructions defining operation according to at least one embodiment of the present invention as described herein in relation to the signal flow diagrams and flow chart and other operation described herein. Specifically, memory portion 524 includes computer instructions that define logic for introducing a delay prior to initiating steps to tear down the Iu and RRC interfaces after a mobile node has attached successfully. Processor 504 retrieves the computer instructions stored in memory portion 524, accordingly, to execute the logic defined by the computer instructions.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A method in an SGSN of a GPRS/UMTS network for wireless communications including a mobile node, the SGSN, a GGSN, an HLR, an SMS-G and a SMS-SC, the method comprising:
   receiving, from the mobile node, an initial UE (attach request) message to establish a signaling link;
   authenticating the mobile node to determine whether to allow it to attach to the network;
   informing an HLR that the mobile node is attached;
   accepting and completing the attach;
   delaying the tear down of the attached signaling link to keep the mobile node in a connected mode of operation with signaling links present;
   receiving a short message service message from an SMS gateway (interworking function);
   delivering the short message service message to the mobile node; and
   tearing down the attached signaling link to place the mobile node in a standby mode of operation:
   wherein the step of delaying includes initiating a countdown timer;
   wherein the delaying step is terminated and the attached signaling link is torn down upon determining that there are no pending SMS messages for the mobile node.

2. The method of claim 1 wherein the count down timer is in the range of ten to fifteen seconds.

3. The method of claim 1 further including forwarding a short message result to the SMS-G.

4. The method of claim 3 wherein the step tearing down the attached signaling link further includes sending an Iu release command to an RNC.

5. The method of claim 4 wherein the step tearing down the attached signaling link further includes receiving an Iu release complete signal from the RNC.

6. The method of claim 1 wherein the step of authenticating the mobile node includes sending an identity request and receiving an identity response.

7. The method of claim 1 wherein the step of accepting and completing the attach further includes updating the mobile node location to the HLR.

8. The method of claim 7 wherein the step of accepting and completing the attach further includes receiving subscriber data from the HLR.

9. The method of claim 8 wherein the step of accepting and completing the attach further includes sending a subscriber data acknowledge signal to the HLR.

10. The method of claim 9 wherein the step of accepting and completing the attach further includes receiving an update location acknowledge signal from the HLR prior to generating the attach accept signal to the mobile node.

11. A method in an SGSN of a GPRS/UMTS network for wireless communications including a mobile node, the SGSN, a GGSN, an HLR, an SMS-G and a SMS-SC, the method comprising:
   receiving, from the mobile node, an initial UE (attach request) message to establish a signaling link;
   authenticating the mobile node to determine whether to allow it to attach to the network;
   informing an HLR that the mobile node is attached;
   accepting and completing the attach;
   determining whether to delay tearing down the attached signaling link;
   delaying the tear down of the attached signaling link to keep the mobile node in a connected mode of operation with signaling links present;
   receiving a short message service message from an SMS gateway (interworking function);
   delivering the short message service message to the mobile node; and
   tearing down the attached signaling link to place the mobile node in a standby mode of operation.

12. The method of claim 11 wherein the determining step includes evaluating whether the mobile node is SMS message capable.

13. The method of claim 11 wherein the determining step includes evaluating whether the mobile node is an SMS subscriber.

14. The method of claim 11 wherein the step of delaying includes initiating a countdown timer.

15. The method of claim 14 wherein the count down timer is in the range of ten to fifteen seconds.

16. The method of claim 15 wherein the delaying step is terminated and the attached signaling link is torn down upon determining there are no pending SMS messages for the mobile node.

* * * * *

UNITED STATES PATENT AND TRADEMARK OFFICE
CERTIFICATE OF CORRECTION

PATENT NO. : 7,587,209 B2
APPLICATION NO. : 10/334669
DATED : September 8, 2009
INVENTOR(S) : Richard Bianconi, Jay Armstrong and Paul Boudreaux It is certified that error appears in the above-identified patent and that said Letters Patent is hereby corrected as shown below:

Column 7, line 65, in Claim 1: replace "operation:" with --operation;--.

Column 8, line 5, in Claim 2: replace "often" with --of ten--.

Column 8, line 61, in Claim 15: replace "often" with --of ten--.

Signed and Sealed this

Sixteenth Day of February, 2010

David J. Kappos
*Director of the United States Patent and Trademark Office*